Mar. 20, 1923.
C. F. STEHLIN.
CAGE PRESS.
FILED NOV. 28, 1921.
1,448,774.
7 SHEETS—SHEET 3.
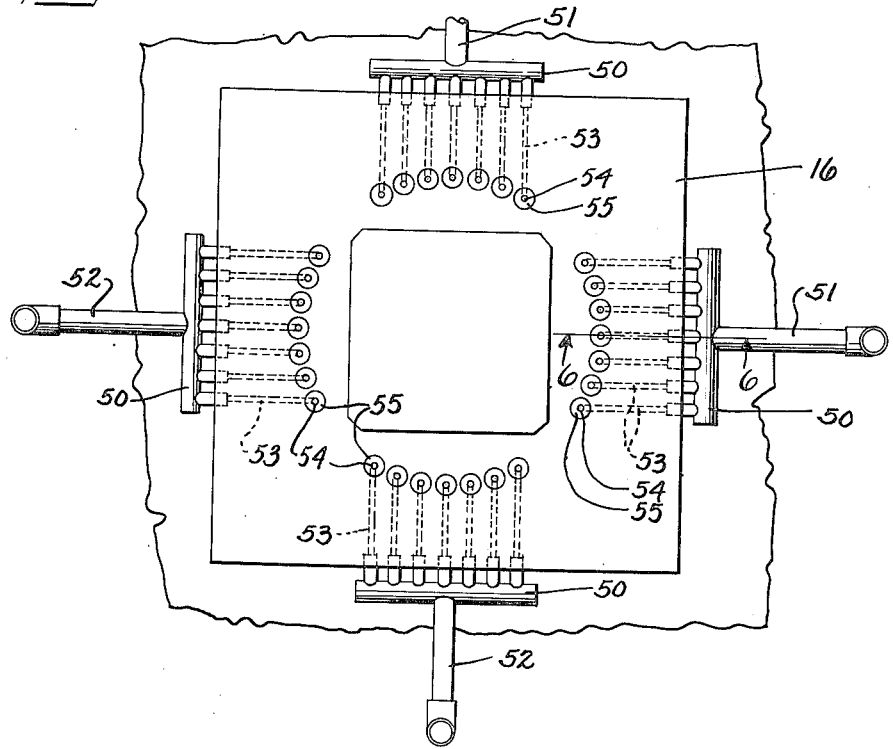
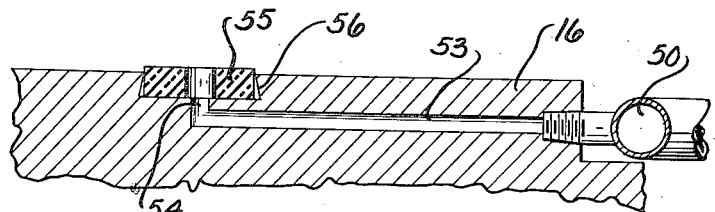
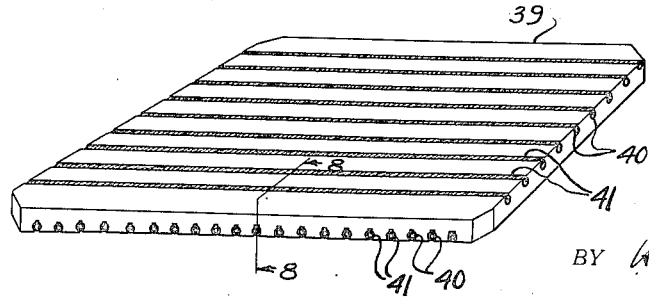
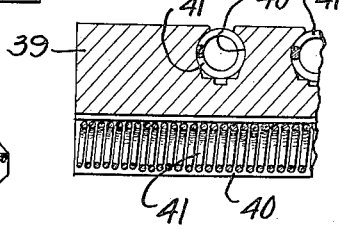
Charles F. Stehlin
INVENTOR
BY His
H. H. Dyke
ATTORNEY Mar. 20, 1923.
C. F. STEHLIN.
CAGE PRESS.
FILED NOV. 28, 1921.
1,448,774.
7 SHEETS—SHEET 4.
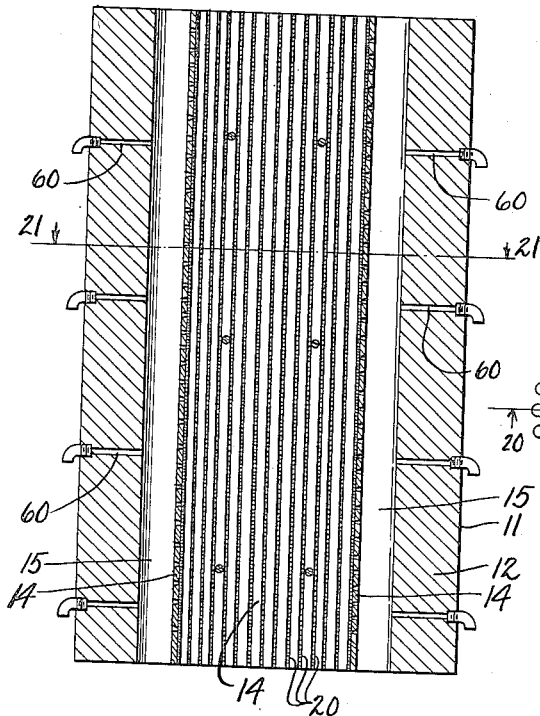
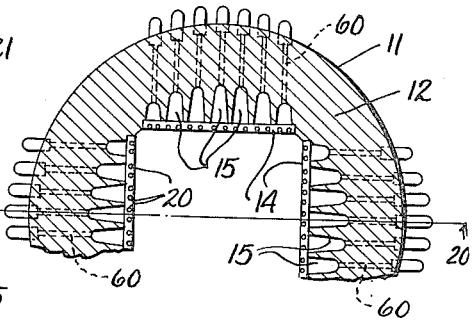
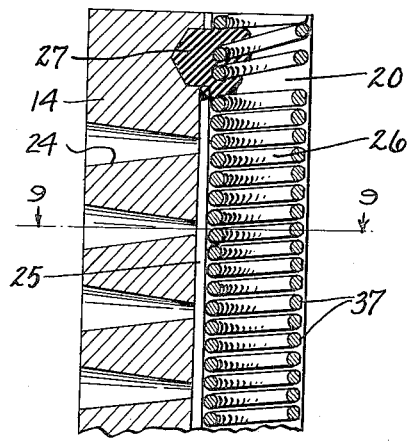
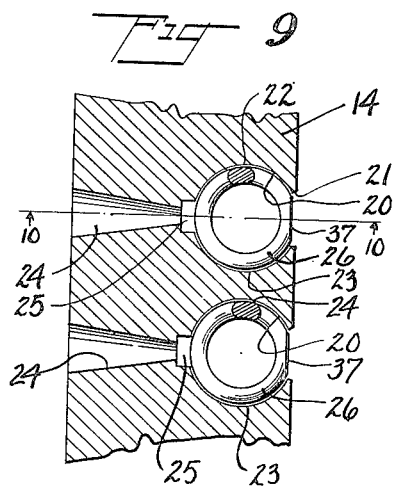
Charles F. Stehlin, INVENTOR
BY His
H. H. Dyke, ATTORNEY

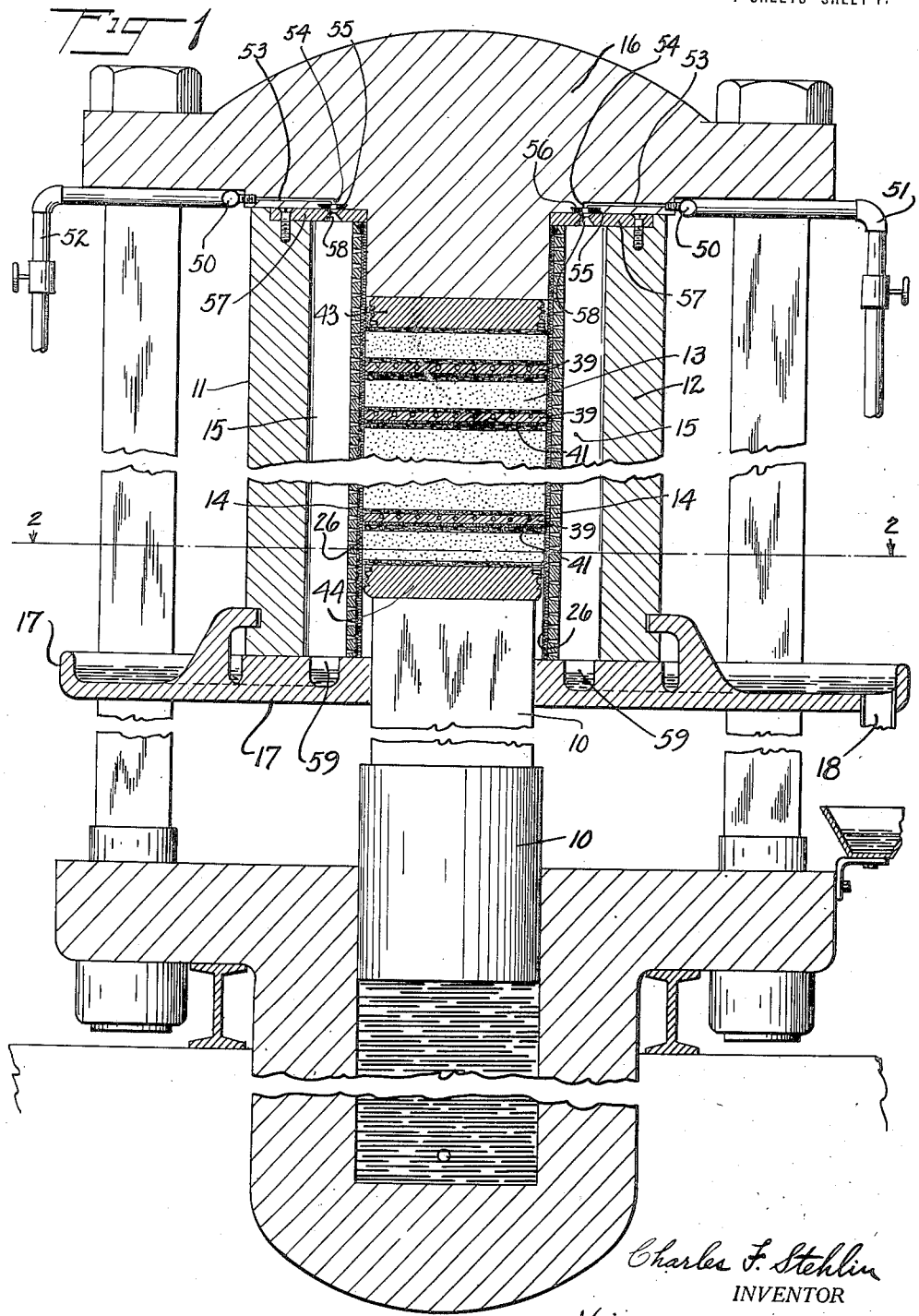

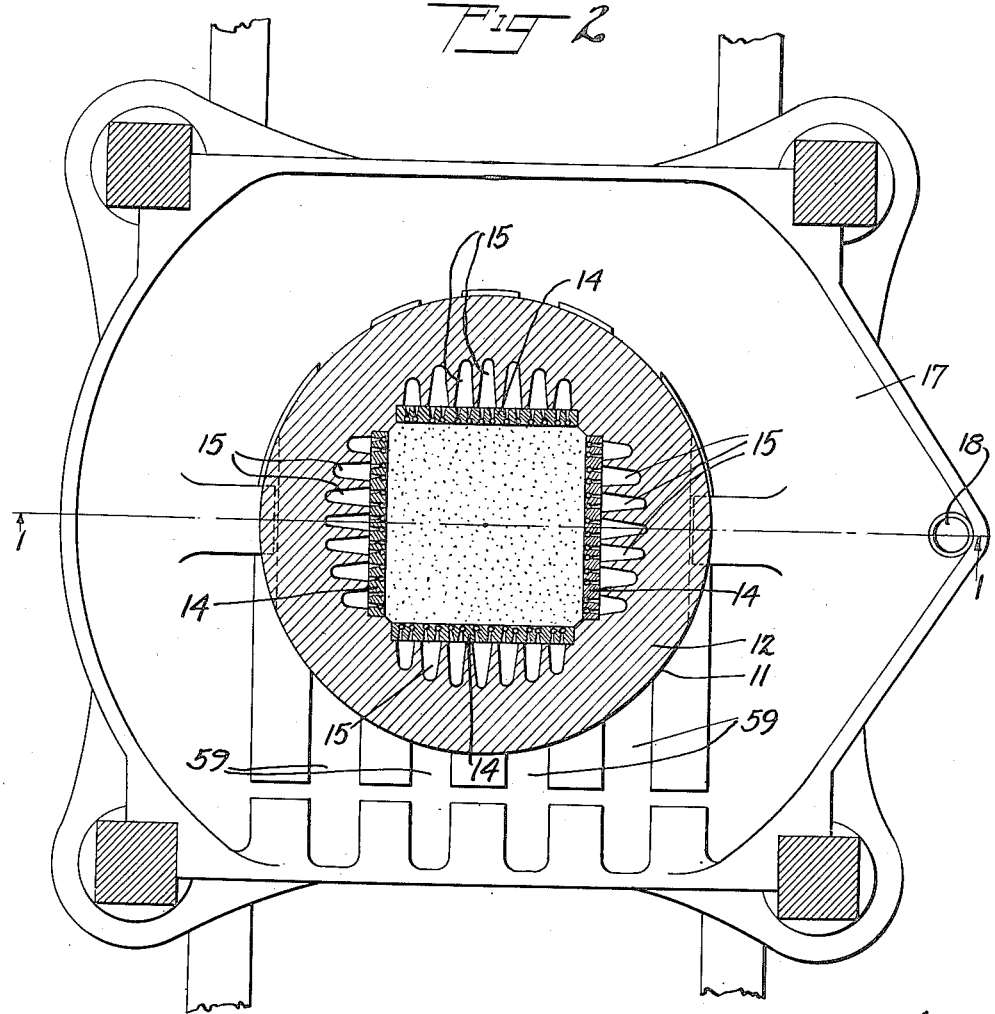
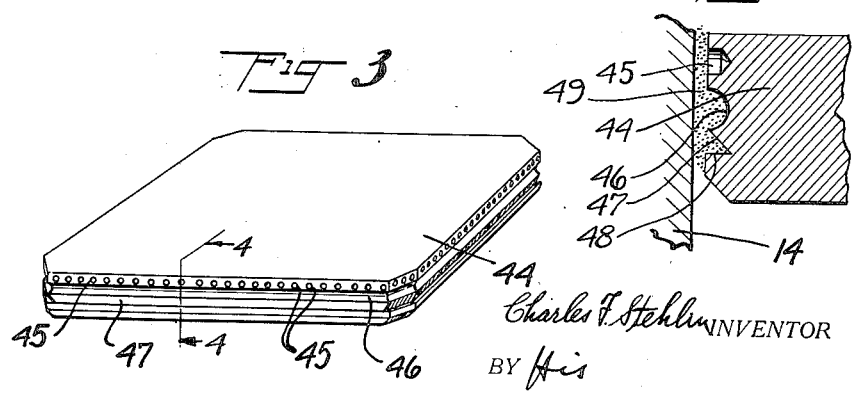

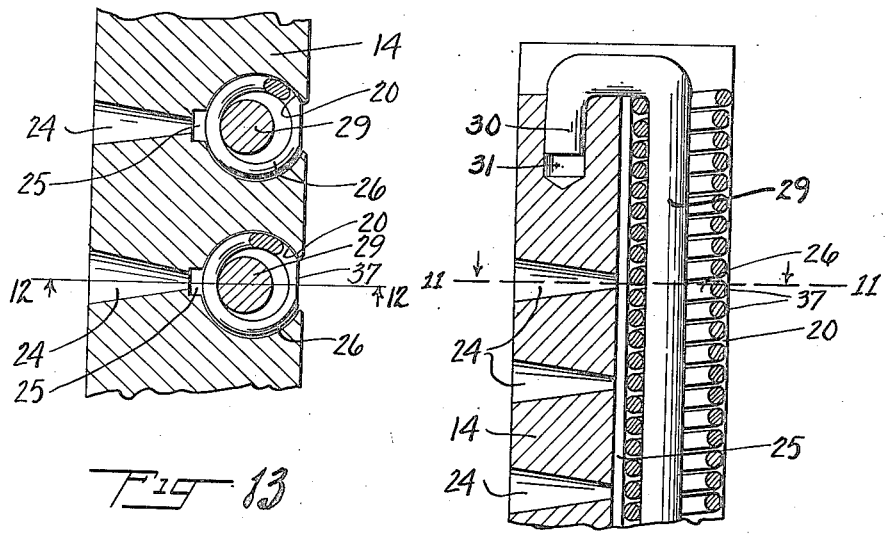
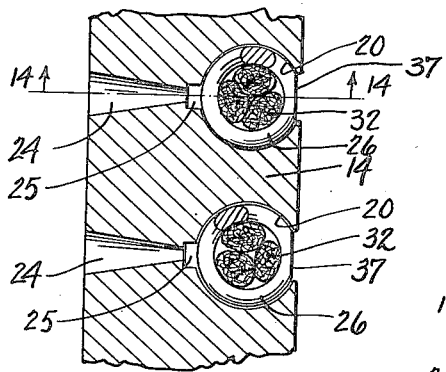
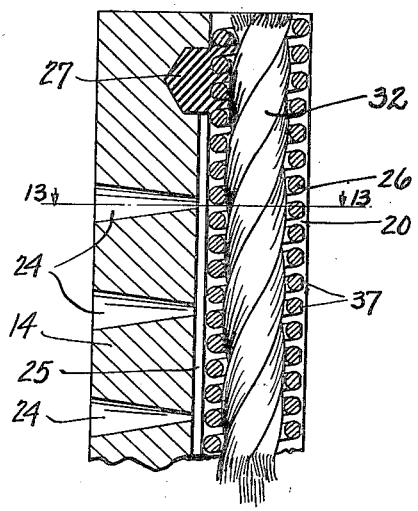
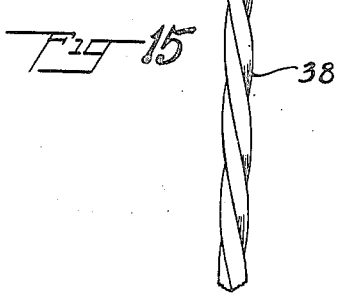

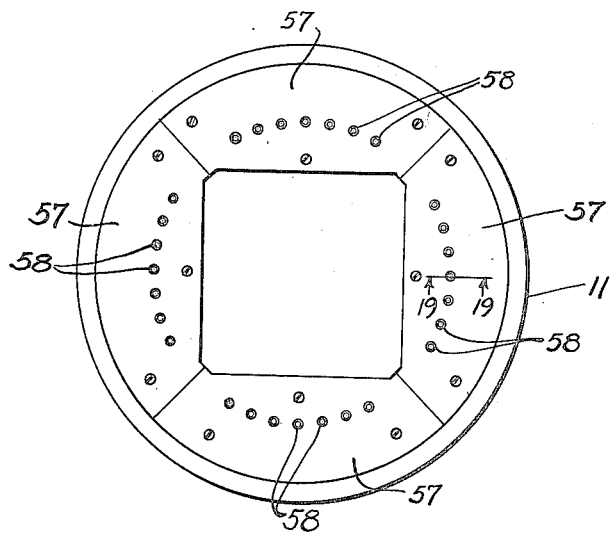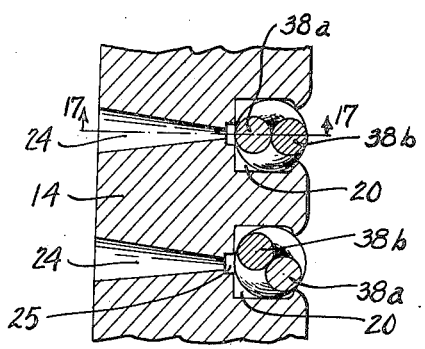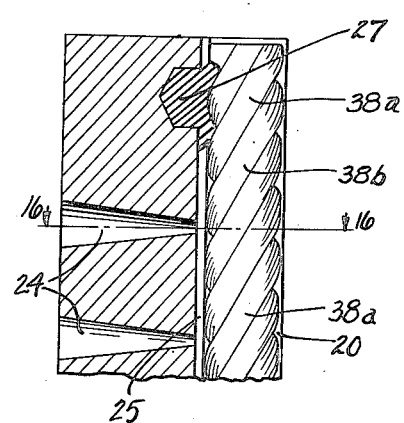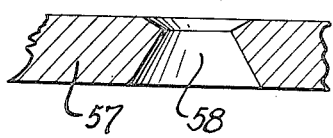

Mar. 20, 1923.
C. F. STEHLIN.
CAGE PRESS.
FILED NOV. 28, 1921.
1,448,774.
7 SHEETS—SHEET 7.
Fig 22
Fig 23
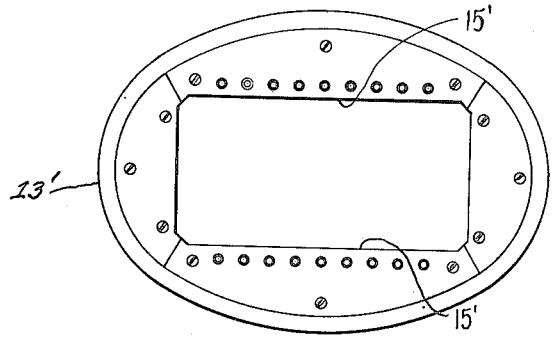
Fig 24
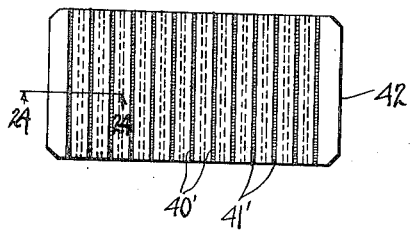
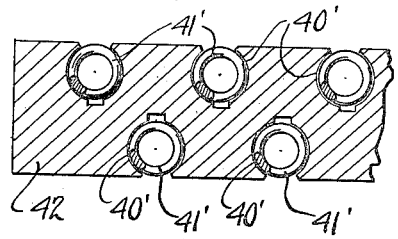
Fig 25
Fig 26
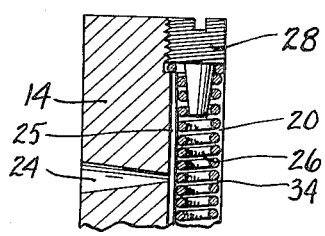
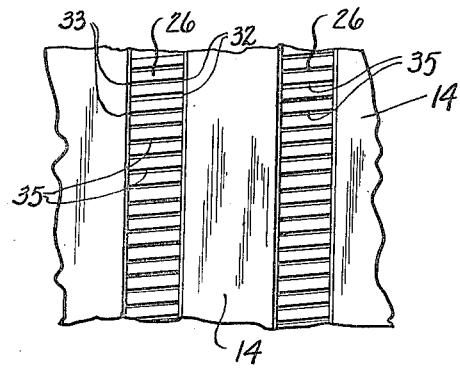
Charles F. Stehlin INVENTOR
BY His
H. H. Dyke ATTORNEY Patented Mar. 20, 1923.

1,448,774

UNITED STATES PATENT OFFICE.

CHARLES F. STEHLIN, OF NEW ROCHELLE, NEW YORK.

CAGE PRESS.

Application filed November 28, 1921. Serial No. 518,209.

*To all whom it may concern:*

Be it known that I, CHARLES F. STEHLIN, a citizen of the United States, and a resident of New Rochelle, county of Westchester, and State of New York, have invented certain new and useful Improvements in Cage Presses, of which the following is a specification.

My invention relates to cage presses, such as are used for expressing oil from ground and cooked copra meal and the like. While the invention is of broad application to various materials, it will herein be described more particularly with respect to a copra press.

The principal objects of the invention are the following:

The provision of outlet ducts for the expressed oil, which are of very greatly enlarged capacity as compared with the present practice, thereby affording rapid and extensive egress for the oil and enabling the operation of expressing the oil to be carried on more efficiently and in a much shorter time than is possible with present practice;

The construction of the oil outlet ducts and related parts is such as to substantially prevent clogging and to permit ready cleaning thereof, thereby keeping the oil outlet devices of the press in a state of substantially maximum efficiency at all times, and enabling the operation of oil expressing to be speeded up, and securing increased output from a press installation.

The provision of improved separator plates interposed between the layers of meal in the cage, and adapted to permit the passage of oil from the interior of the mass to the oil outlet devices rapidly and efficiently.

The provision of improved top and bottom cage plates provided with grooves, recesses or the like, about their edges, and such bottom plate being adapted to prevent the solid parts of the material being pressed from getting packed between the hydraulic ram and the sides of the cage, as has heretofore been possible, and has resulted in the sticking or binding of the press plunger and interfering with its withdrawal by gravity.

The provision of improved means for keeping the oil passages of the press free from accumulation of the solid material being pressed therein, and preventing clogging of such passages.

Further objects of the invention will appear in connection with the following description.

In the accompanying drawings forming a part of this specification, I have shown certain preferred embodiments of my invention, but it is to be understood that the same are only for the purpose of illustration and for affording an understanding of the invention, and not for limitation.

Fig. 1 is a vertical sectional view showing a cage containing a charge of meal being subjected to pressure in a so-called "finishing press", the section being taken on line 1—1 of Fig. 2. Fig. 2 is a sectional view taken on line 2—2, Fig. 1. Fig. 3 is a perspective view of a cage end plate. Fig. 4 is an enlarged sectional view taken partially on line 4—4 of Fig. 3. Fig. 5 is a bottom plan view of a presshead showing steam pipe connections thereto. Fig. 6 is an enlarged sectional detail view taken on the line 6—6 of Fig. 5. Fig. 7 is a perspective view of separator plates embodying my invention. Fig. 8 is a sectional detail view taken on line 8—8 of Fig. 7. Fig. 9 is a cross-sectional view of a cage lining plate illustrating a preferred form of oil outlet groove and insert, the section being taken on line 9—9 of Fig. 10. Fig. 10 is a longitudinal sectional view of a cage lining plate taken on line 10—10, Fig. 9. Fig. 11 is a sectional view similar to Fig. 9, but showing a modification and is taken on line 11—11, of Fig. 13. Fig. 12 is a longitudinal sectional view taken on line 12—12, Fig. 11. Fig. 13 is a cross-sectional view similar to Figs. 9 and 11, and taken on line 13—13, Fig. 14. Fig. 14 is a longitudinal sectional view taken on line 14—14 of Fig. 13. Fig. 15 is a part sectional and part elevational view of a modified form of insert for the oil outlet ducts. Fig. 16 is a sectional view of a further modified form similar to Figs. 9, 11 and 13, and taken on line 16—16 of Fig. 17. Fig. 17 is a longitudinal sectional view taken on line 17—17 of Fig. 16. Fig. 18 is a top end view of a cage showing steam inlet openings in the cover plates thereof. Fig. 19 is a detail cross-sectional view taken on line 19—19 of Fig. 18. Fig. 20 is a longitudinal sectional view of a modified form of press cage in which the vertical oil grooves are provided with a series of outlets extending to the exterior of the cage at graduated heights. Fig. 21 is a cross-sectional view taken on line 21—21 of Fig. 20. Fig. 22 is a view similar to Fig. 21, but showing a modified form of cage, elongated in cross section, and having outlet ducts on the longer sides only. Fig. 23 is a plan view of a separator plate as used with the cage of Fig. 22. Fig. 24 is a cross-sectional view on line 24—24 of Fig. 23. Fig. 25 is a detail sectional view showing a modified form of holding means for the coiled wire duct groove insert of Fig. 9, and Fig. 26 is a fragmentary face view showing an outlet groove with a coiled wire insert, as shown in cross-section in Figs. 9 and 10.

Reference character 10 designates the hydraulic ram, and 11 a press cage which is preferably made up of a heavy steel casting 12 having the press chamber 13 therein lined with the plates 14, containing the oil outlet passages and grooved out behind the plates 14, as shown at 15, to provide drains for the oil pressed out through the passages in plate 14. Presshead 16 holds the cage down against the action of ram 10, and 17 is the oil pan into which the oil grooves 15 discharge, and which has an outlet for the oil at 18.

The parts so far described are of conventional form and their construction and arrangement may be extensively varied, as will be readily understood.

Oil outlet ducts for the cage plates.

It has been customary heretofore to provide the cage plates with a series of straight grooves having oil duct openings not to exceed about two or three hundredths of an inch in width at the surface of the plate, and widening out into comparatively wide grooves behind the surface of the plate, these enlarged grooves in turn communicating through holes in the back of the plate with the drain grooves formed in the cage casting. Such duct openings have been made extremely narrow in order to prevent, so far as possible, the passage of solid matter therethrough, but notwithstanding this, more or less solid matter does get through, and sooner or later fills up the grooves, and after use for a comparatively short time it becomes necessary to remove the plates and clean them, as by boiling in strong soda solution, which is a troublesome job and is likely to result in production of low grade oil unless extreme precautions are taken to completely remove the alkali The production of large capacity oil outlet ducts, in addition to being of importance in getting a rapid and desirably high oil extraction, is of great importance in other directions. For example, when there is a clogging up of the outlet ducts through which the oil should pass out from the meal contained in the compartment between two separator plates upon application of pressure, and the outward passage of oil is prevented by such clogging, the oil must escape elsewhere, and so breaks through past the separator plate or plates and the separator pads, of camel's hair or the like, which are customarily placed next to the separator plate and on each side thereof, into the next compartment whose outlet ducts are not so clogged, and from which the oil can escape. In practically all cases the oil breaking through in this manner from one compartment to another carries with it a considerable amount of the solid material of the meal, which results in the production of thin places in the cake formed between separator plates, where the outlets are clogged up, and in thickened places in the cake formed in the compartment into which the oil and solid material escapes before the oil can get to unclogged ducts.

This unevenness of cakes produced, while objectionable and troublesome, is by no means the greatest harm which results, since under the enormous hydraulic pressure of several thousand pounds per square inch the separator plates are bent out of shape and the expensive camel's hair pads are injured or actually torn, so that great expense and trouble are encountered in carrying on pressing operations.

Furthermore, when such malformed cakes are produced by reason of clogging up of oil ducts in the manner described, the plates and cakes are likely to bind in the cage and require the application of extremely high hydraulic pressure in "breaking out" the cakes after the pressing operation is completed, which may result in injury not only to the cage plates and pads, but to the cage and pressing apparatus generally.

An object of the present invention is to provide oil outlet means in which the defects heretofore encountered are substantially eliminated, which provide high capacity outlet ducts for the oil and are substantially free from clogging.

In one way in which these and related advantageous results are attained in accordance with my invention, a series of longitudinal grooves are provided in the cage plates which grooves are of substantial width, say in the neighborhood of $\frac{3}{16}''$ to $\frac{1}{4}''$ wide, though the precise dimensions may be varied considerably in practice. In these grooves which communicate at their back with the oil passages in the cage casting through holes as heretofore, are insert devices adapted to provide extensive extremely narrow and minute ducts for outlet of the oil and of such character to prevent clogging. A preferred groove insert is made up of relatively closely coiled wire wound in the form of a long helix. It will be seen that with oil outlet devices of this character it is possible to keep the oil passages of the necessary minute width as to substantially exclude solid particles passing therethrough, and at the same time to secure a total area or extent of oil outlet passages for each groove very many times in excess of what was possible with the outlets heretofore used. Outlets for the oil are provided on each side of the coiled wire, between it and the walls of the groove, such outlets being of greatest width intermediate between each of the coils of wire, as will be readily understood, and furthermore, passages are provided extending transversely of the groove between the adjacent turns of the coils, thus securing many times the oil outlet passage space heretofore available.

With oil outlet devices constructed in the manner just described, I have found that very advantageous results can be obtained in the direction of prevention of clogging by what I may refer to as creeping or breathing of the coil inserts. The coil to be inserted in the tube is most conveniently made by winding the wire on a mandrel, and upon inserting it in the groove, it is preferably stretched somewhat between its opposite ends to widen out or open up to some extent the transverse oil passages between the adjacent turns of the coil. As the material is compressed within the cage and subjected to movement lengthwise of the cage plates containing the inserted coils, it tends to move the contacted portions of the coil along with it, and such slight longitudinal movement of the coils in their grooves as takes place during the pressing operation, is of great advantage in that any particles of solid material entering the grooves do not become lodged permanently in a particular spot for the adhesion of other particles thereto, thereby building up a clogging mass, but the particles are displaced by the breathing or creeping action of the coil and run off with the oil, instead of becoming lodged and forming nuclei for the collection of particles which will result in clogging the drains.

The surface of the inserted coils which is exposed at the openings of the grooves on the face of the cage plates, is preferably smoothed off, as with an emery wheel or the like, in order to prevent same being taken hold of too strongly by material being subjected to high compression in the cage, and the grooves into which these coils are inserted are preferably undercut and the coils inserted lengthwise from the end of the cage plates.

While wire coils such as above described are preferably made use of as inserts for the oil grooves in the cage plates, various other types of inserts can be used, if desired.

The preferred form of oil duct arrangement is shown in Figs. 9, 10, 25 and 26. The cage plates 14 have grooves 20 formed therein, which are preferably made as near circular in cross-section as is conveniently possible, having a narrowed mouth or opening 21 and rounded sides 22, 23. Preferably tapered holes 24 extend from the base of grooves 20 to the rear of plate 14, and free passage from one to another of the holes 24 is facilitated by forming a relatively shallow auxiliary groove 25 in the rear of the principal groove 20.

The coiled wire 26 is introduced into groove 20 from the end thereof, and is held in place, preferably at each end, by any suitable means. In Fig. 10 I have shown how it may be held by solder, a recess 27 being bored to provide a suitable anchor for the solder. Such fastening may be readily released, when desired, as by the application of a blow-torch. In Fig. 25 I have shown the coil held in place by an expanding and clamping screw 28. In Figs. 11 and 12 I have shown how a binding wire 29 may be passed through the coil and anchored in the plate, as by having its turned over end 30 inserted in a hole 31, and other fastening means may be used, so long as the coil is securely held, but yet can be removed, if desired.

Filtering material, such as preferably twisted strands 32 of camel's hair, cord or the like, may be placed within the coil 26, if desired, as shown in Figs. 13 and 14, in order to reduce the quantity of solid material passing out with the oil.

Fig. 26 serves to show the enormous capacity of my improved oil outlet passages or ducts. There are three principal divisions of these ducts, the oil being permitted to pass out on each side of the coil 26 between it and the groove wall, as indicated at 32, 33, and these ducts are widest between the convolutions as indicated at 34. Transverse ducts 35 are also provided between the convolutions of the coil, so that for each groove narrow oil ducts are provided, whose combined length is several times the length of the groove, and whose oil carrying capacity is correspondingly great. The oil carrying capacity of the ducts for the separate grooves is so greatly increased by application of the present invention that the number of oil grooves may be substantially reduced, as compared with prior practice, and as a general rule the provision of two oil outlet ducts for each of the oil passages 15 in the cage is sufficient, though a greater number may be provided, if desired.

The outer surface of the coil 26 is preferably dressed off flat after the coil has been secured in place, as indicated at 37, Fig. 9, so as to present as smooth a surface as possible to the meal being pressed.

More or less movement of the coil longitudinally of its groove takes place during the various operations of filling the cage, pressing and breaking cake, and the like, which serve to prevent any solid particles from becoming permanently lodged in a particular spot to start accumulation and ultimate choking, the lodged particles being loosened in the manner described pass out with the oil, from which they may be removed by sedimentation, filtration and the like.

While a preferable insert for the oil drainage groove comprises a coiled wire as described, and adapted to creep more or less in the groove, at least a portion of the advantages of my invention may be secured by the use of inserts of various forms, such for example, as the twisted square wire insert 38 shown in Fig. 15.

Another of the various alternative forms of inserts which may be utilized is shown in Figs. 16 and 17 and consists in a pair of round wires 38$^a$ and 38$^b$ twisted together into substantially cylindrical form.

*Gage press plates.*

I preferably construct the separator plates so as to conduct the oil to the cage walls, doing away with expensive camel's-hair pads, and requiring no more than a protecting layer of felt or the like on each side. The separator plates are preferably provided with ducts of extensive area and in substantially the same manner as already described in connection with the cage lining plate ducts.

In Fig. 7 I have shown a separator plate 39 of the usual substantially square form, provided with undercut grooves 40 arranged at right angles to one another on the opposite faces of the plate, and provided with coiled wire inserts 41 to provide extensive oil ducts, as already described in connection with the cage lining plates. The central opening in the coil affords easy passage of oil to the ends of the grooves.

Heavy steel plates are customarily used for separator plates, and the same may be made use of in accordance with my invention and provided with grooves and inserts as just described. However, with the ample provision which I provide for drainage and oil through the cage walls, thereby eliminating the causes of thin places in the cakes as already described and consequent bending and malformation of the separator plates, it is not necessary to make use of material as strong as or heavy as the steel plates for this purpose, and various other materials may be utilized, such as sheets or plates of fibre and the like.

In order to secure short travel for the oil in its passage to the cage wells, I have shown a modified form of separator plate 42 in Fig. 24, which is several times as long as it is wide, and has oil grooves 40' with coil inserts 41' extending transversely thereof and preferably arranged in staggered relation on the opposite sides, as shown in Fig. 24. With such form of press the drainage plates 15' are arranged only on the longer sides of the press chamber 13', as shown in Fig. 22.

The top and bottom cage plates 43 and 44 are preferably made quite thick and heavy, so as to permit the use of a cage chamber substantially larger than the cross section of the ram to thereby prevent binding of the ram by solid material getting between it and the cage walls.

The edges of these heavy end plates are recessed in a manner adapted to afford an anchorage therein for compressed solid material which gets between the end plates and the cage walls. In the form shown, a series of shallow recesses made by drilling shallow drill holes 45, is provided about the inner edge of the plates, that is to say, in the case of the bottom plate, about the upper edge thereof which comes next to the material to be compressed. Below this row of drill holes 45 there is provided in the edge of the lower plate 43 a substantially half-round groove 46, extending about the edge of the plate at substantially the middle thereof, and finally the angular groove 47 near the bottom of the plate, having a substantially square edge, as indicated at 48. All or part of the anchoring recesses or grooves may be used, or anchoring recesses of other forms may be made use of, so long as they will serve to secure the same purpose.

The top and bottom plates 44 and 43 are made small enough to allow a substantial clearance between them and the walls of the cage. With a cage 5 ft. long, for example, and having a chamber 18 inches across, a clearance of $\frac{1}{8}$ inch on each side may be left between the bottom plate and the walls at the bottom of the cage. The chamber in the cage is preferably slightly enlarged on a gradual taper from the bottom to the top, as for example, the lateral dimension at the top may be made $\frac{1}{4}$ inch greater than that at the bottom, by giving the chamber the slight outward flare from bottom to top of about $\frac{1}{8}$ inch on each side. With such arrangement there is a clearance of about $\frac{1}{4}$ inch on all sides between the end plates and the cage walls at the upper end of the cage chamber. The particular figures just given are, of course, illustrative only and are merely intended to give an idea of the degree of taper which may be used in a particular instance.

In filling the cage a handful of meal is preferably distributed upon the bottom plate about the edges thereof before a pad is inserted, and the filling proceeded with in the usual way, with alternating layers of meal and separator plates with pads on each side thereof. This material entering the clearance space between the cage plates and bottom press plate is compressed therein and forms a thin cohesive layer 49 which bulges on the sides next to the plate formed by the material entering the anchoring recesses therein, and thereby form substantially an anchored dam, which travels upwardly with the bottom plate and prevents oil from passing down past the edges of the bottom plate.

The top cage plate 44 which is placed in the cage when the filling is completed is preferably constructed in the same way as the bottom cage plate 43, but is, of course, arranged in the reverse position or upside down with respect to the bottom plate.

The bottom cage plate being constructed as described not only enables the use of a ram having a substantially smaller cross-section than that of the cage chamber and which will not bind therein, but is of special advantage in that it is substantially firmly held in position in a movable cage in which the charge has been partially compressed from below, and when such movable cage is being transferred from the filling press to the finishing press, the dam of solid material collecting about the edges of the plate and between it and the cage serves not only to prevent the outward passage of oil, but serves as a substantially wedge-like support for maintaining the bottom plate and the charge above the same in its position in the cage. This feature is of great importance since the dropping of the bottom plates in the cage when the material is being moved to the finishing press has been a frequent cause of interference with and slowing up of pressing operations, it being necessary in such case to move the cage back to the filling press and refill the cage before the pressing operation can be further proceeded with.

Cage cleaner and heater.

Provision is made for the frequent removal of lodged solid particles from the drain passages in the cage back of the lining plates, and in this way clogging of these passages is substantially prevented and the pressing operation kept at substantially maximum efficiency.

The preferred means for this purpose comprises a series of steam jets arranged in the under surface of the presshead and adapted to register, when the cage is in elevated position with the vertical drain passages extending longitudinally of the cage.

Steam admitted through the supply means at the head of the press to the drain passages in the cage finds its outlet primarily to the drain pan 17 at the bottom of the press, carrying with it solid particles temporarily lodged in these passages, and by turning on steam for a short time, preferably when the cage is empty, permanent lodgment of solid material and subsequent progressive clogging thereof is prevented. Also the steam escapes to some extent through the ducts in the cage lining plates and assists in keeping same free from lodgment of solid particles therein.

While other fluids, as compressed air and the like, may be used instead of steam for the purpose referred to, I preferably make use of steam, or at least of heated fluid, particularly when pressing materials, such as copra meal, in order to keep the cage up to the desirably high temperature required for getting the best results in pressing operations. Furthermore, it is a distinct advantage, particularly in cold weather, to leave the steam valve "cracked open" during the night, or from an early morning hour, so that when the day's work is started the press apparatus, and particularly the cages will be at the desired relatively high temperature for the start of operations, thereby avoiding the first few unsatisfactory runs usually made when starting up for the day's work, which usually continue until the pressing apparatus has been thoroughly heated up by heat imparted to the cage from the hot meal, and this frequently has resulted in cooling the meal below the temperature appropriate for carrying on pressing operations effectively.

The form of fluid supply means shown for cleaning out and heating comprises a header pipe 50 supported in and extending about the presshead and provided with steam or other suitably preferably heated fluid from valved supply pipes as 51, 52. The header pipe 50 communicates through bores 53 in the presshead with jet outlets 54 which are directed downwardly and which are preferably surrounded by suitable packing means, as washers 55 of leather, fibre or the like inserted in recesses 56.

The top plate 57 for the cage 11 has inlet openings 58 formed therein opposite the upper ends of the cage drain passages 15 and in registration with the jet outlet 54, and in order to minimize entrance of solid material therein, as when filling or removing charges of meal, the inlet openings 58 are tapered, being made only large enough at their upper ends to permit the entrance of the fluid jets and widening out below to secure access of steam to the drain passages 15, which are preferably of comparatively large section, and which communicate with the horizontal outlet passages 59 in the drainage pan 17 at the bottom of the cage.

An alternative type of steam pipe inlets is shown in Figs. 20 and 21 in which the cage passages 15 have openings 60 communicating therewith and extending to the outside of the cage at graduated heights along the cage walls, and the pipe connections for steam inlet may be made at any desired opening or openings. These passages 60 are usually left open and serve as indicators to show whether clogging has taken place, as for example, if in pressing, oil flows out of one of these openings, this serves to show that the passage is clogged below the point, and the passage may be cleared, as by admission of steam at an outlet lower down in the passage.

It will be seen that a press in accordance with my invention has numerous important features of advantage contributing jointly to continued good yields of oil or other fluid being rapidly expressed, and high efficiency in operation, among which may be mentioned the following: The oil is conducted through self cleaning duct containing devices to and through the cage walls, resulting in good oil yields and cakes of uniform thickness, and avoiding bent separator plates and injured filter pads attendant upon the presence of clogged oil ducts. Lodgment of solid particles in the ducts and outlet passages and consequent clogging thereof is substantially prevented. The cage and other press parts are readily heated as required and binding of the press ram in the cage is avoided.

The term "press plate" used in my claims is used as a matter of verbal convenience to designate a separator press plate or a chamber wall plate or their equivalents.

It is to be understood that the invention includes changes and modifications which may be resorted to within the scope of my claims.

I claim:

1. In a press, a press plate having a fluid discharge groove formed therein and an insert member in said groove, and providing fluid passage ducts between it and the groove walls.

2. In a press, a press plate having a fluid discharge groove and an insert member therein providing fluid passage ducts extending transversely thereof.

3. In a press, a press plate having a fluid discharge groove therein, an insert member in said groove providing fluid discharge ducts between it and the groove walls, and also ducts extending transversely of the inserted member.

4. In a press, a press plate provided with fluid discharge grooves, and with coiled wire inserts in said grooves.

5. In a press, a press plate provided with fluid discharge grooves and inserts therein, adapted for limited local endwise movement within the groove.

6. In a press, a press plate provided with fluid discharge grooves and with coiled wire inserts in said grooves, said inserts being fastened in place in the neighborhood of their ends only.

7. In a press, a press plate provided with undercut grooves and with inserted members therein adapted to occupy somewhat less than the entire space within the groove, and providing extensive substantially narrow fluid discharge ducts.

8. In a press, a press plate provided with undercut oil discharge grooves and coiled wire inserts loosely fitting in said grooves, and held in place therein at their ends, and having a flattened surface at the open sides of the grooves.

9. In a press, a press plate having undercut grooves therein on the face exposed to material being pressed, and inserts in said grooves adapted to provide oil ducts extending through the inserts.

10. In a press, a press plate having grooves opening on the face thereof exposed to finely divided material being pressed, and a coil insert loosely received in said grooves.

11. In a press, a press plate having grooves opening in the face thereof exposed to material being pressed, an inserted member in said grooves, providing fluid ducts therethrough and therearound, and fluid outlet openings being provided in communication with the grooves behind the inserted member.

12. In a press, a press plate having undercut grooves opening on the face thereof exposed to material being pressed, and provided with fluid outlet openings in rear of said grooves and communicating therewith, and a coiled wire insert loosely received in said grooves, with the turns thereof normally somewhat out of contact with one another, and fastened in the neighborhood of its ends only, and having a substantially smooth surface on the side exposed at the open side of the groove.

13. In a press, a press plate provided with undercut grooves having a narrowed extension groove in rear thereof and fluid outlet openings communicating with said extension groove, and insert members loosely received in said undercut grooves providing fluid outlet ducts therethrough and therearound.

14. In a press, a press plate provided with grooves opening on the side exposed to material being pressed, and insert members therein adapted for localized longitudinal displacement within said groove.

15. In a press, a press plate provided with grooves opening on the side exposed to material being pressed, and insert members in said grooves adapted for creeping movement within the groove under the action of material being pressed.

16. In a press, an end plate for the press cage, having a substantial clearance between it and the cage walls, and anchored means on the edges of the plate whereby solid material massed between the plate and cage wall is retained in contact with the plate.

17. In a press, a cage, a press plate adapted to be received in the cage with a clearance between it and the cage walls, and recesses provided in the edge of the plate whereby solid material accumulating about the edges of the plate is substantially anchored thereto and carried along with the plate during the movement of the latter in the cage.

18. In a press, a cage having a slightly tapering longitudinally extending chamber therein, and a cage end press plate adapted to be received in the cage with a clearance therearound, and recesses in the edge of the plate adapted to receive solid material entering the clearance space and retaining same in position to move with the plate.

19. A cage end plate for cage presses adapted to fit in its cage with a clearance therearound, and having recesses in its edges adapted to receive solid material entering between the cage and the plate, and to retain same in position to move with the plate.

20. A cage end plate for press cages of substantial thickness and having a plurality of series of recesses or grooves in its edges, whereby solid material is prevented from getting past the plate, and a press ram of section substantially smaller than the section of the cage chamber may be used, and the ram kept from being jammed by solid material getting between it and the cage walls.

21. A bottom end cage plate for press cage, having means on its edges for collecting and retaining solid material in place between it and the cage, whereby the plate is supported in position to hold a partially compressed charge within the cage.

22. A bottom end press plate for press cages, having on its edges a sharp angled groove.

23. A bottom end cage press plate for press cages, having on its edges a rounded groove and a sharp angled groove adjacent to the rounded groove.

24. A bottom end press plate for press cages, having on its edges a series of separated recesses, a rounded groove and a groove having a sharp angled edge.

25. A bottom end press plate for press cages of substantial thickness and adapted to permit the use of a ram of much smaller section than the section of the plate, said plate having recessed parts thereof comprising a series of shallow separated openings adjacent to its inner surface, a round bottomed groove adjacent to said series of openings, and a second groove of angular cross section adjacent to the round bottomed groove and having its bottom wall at substantially right angles to the edge of the plate.

26. In a press, a cage provided with plates containing fluid ducts and with fluid outlet passages behind the plates, and means for admitting fluid, as steam, to said passages.

27. In a press, a cage provided with plates containing fluid ducts and with fluid outlet passages behind the plates, and means for admitting fluid, such as steam, to said passages at one end thereof.

28. In a press, a cage provided with plates containing fluid ducts and with fluid outlet passages behind the plates, extending throughout the height of the cage, and having outlets at the bottom and a presshead provided with means for admitting fluid, such as steam, to the said passages at the upper ends thereof.

29. In a press, a presshead provided with a series of steam jet openings, and a cage having oil outlet passages adapted to register with said jets.

30. In a press, a cage having a series of vertical fluid passages open at the bottom, and having reduced openings at the top, and a presshead provided with jets for fluids, such as steam, adapted to register with said reduced openings when the cage is in place in the press.

31. In combination, a press cage provided with longitudinal fluid outlet passages open at the bottom and having plates over the top thereof, said plates being provided with apertures in communication with said passages, a press head having steam jets adapted to register with said apertures, and packing means about said jets.

32. A press cage having a chamber lined with plates containing fluid ducts and having fluid outlet passages in rear of said ducts, and means for admitting steam to said passages, whereby lodged solid particles are dislodged from the passages and ducts.

33. A press cage having a chamber lined with plates containing fluid outlet grooves provided with inserted members forming ducts therethrough and therearound, and having fluid outlet passages in rear of said grooves, and means for admitting steam to said passages, whereby lodged solid particles are dislodged from the passages and the ducts.

34. In a press, a press cage having a longitudinally extending press chamber of which one cross sectional dimension is substantially larger than the other, and press plates and separator plates therefor, the separator plates being provided with fluid outlet passages extending only to their longer sides.

35. In a press, a press cage having a chamber therein, which is relatively narrow in one cross sectional dimension and relatively wide in the other, and is provided with fluid outlet ducts on the wider sides only, and separator plates therefor having fluid outlet passages extending transversely thereof.

36. In a press, a press cage having a chamber therein which is relatively narrow in one cross sectional dimension, and relatively wide in the other, and is provided with fluid outlet grooves having locally movable duct forming inserts therein in its widest sides only, and separator plates of a form to be received in said cage and having fluid outlet grooves extending transversely thereof only, said grooves having duct forming inserts therein and being arranged in staggered relation on the opposite sides of the plates.

In testimony that I claim the foregoing, I have signed my name hereto.

CHARLES F. STEHLIN.